(12) United States Patent
Unser et al.

(10) Patent No.: US 10,074,141 B2
(45) Date of Patent: Sep. 11, 2018

(54) METHOD AND SYSTEM FOR LINKING FORENSIC DATA WITH PURCHASE BEHAVIOR

(71) Applicant: MasterCard International Incorporated, Purchase, NY (US)

(72) Inventors: Kenny Unser, Fairfield, CT (US); Kent Olof Niklas Berntsson, Rye, NY (US); Jean-Pierre Gerard, Croton-On-Hudson, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 518 days.

(21) Appl. No.: 14/293,470

(22) Filed: Jun. 2, 2014

(65) Prior Publication Data

US 2015/0348209 A1 Dec. 3, 2015

(51) Int. Cl.
*G06Q 50/26* (2012.01)
*G06Q 40/00* (2012.01)

(52) U.S. Cl.
CPC .......... *G06Q 40/12* (2013.12); *G06Q 50/26* (2013.01)

(58) Field of Classification Search
None
See application file for complete search history.

(56) References Cited

U.S. PATENT DOCUMENTS

| | | | |
|---|---|---|---|
| 2010/0174660 A1* | 7/2010 | Clark | G06Q 20/403 705/318 |
| 2011/0208561 A1* | 8/2011 | Randall | G06Q 30/02 705/7.32 |
| 2012/0278172 A1* | 11/2012 | Mercuri | G06Q 30/02 705/14.58 |
| 2013/0024242 A1 | 1/2013 | Villars et al. | |
| 2014/0129512 A1* | 5/2014 | Kawecki, III | G06F 17/30867 707/607 |

FOREIGN PATENT DOCUMENTS

WO    WO 0165397 A1 * 9/2001 ............. G06Q 20/02

* cited by examiner

*Primary Examiner* — Paul Danneman
(74) *Attorney, Agent, or Firm* — Buchanan Ingersoll & Rooney PC

(57) ABSTRACT

A method for linking forensic data to transaction history includes: storing a plurality of consumer profiles, each profile including data related to a consumer including a consumer identifier associated with the related consumer and a plurality of transaction data entries, each entry including data related to a payment transaction involving the consumer including transaction data; receiving a forensic profile, the profile including forensic data obtained from a computing device; identifying a correspondence between the received forensic data and transaction data included in the stored transaction data entries to obtain a specific consumer identifier; identifying a specific consumer profile where the included consumer identifier corresponds to the specific consumer identifier; and transmitting at least the transaction data included in one or more transaction data entries included in the identified specific consumer profile.

26 Claims, 9 Drawing Sheets

METHOD AND SYSTEM FOR LINKING FORENSIC DATA WITH PURCHASE BEHAVIOR

FIELD

The present disclosure relates to the linking of forensic data to transaction history, specifically the linking of forensic data associated with a computing device with consumer transaction history based on analyzed consumer identifiers and consumer demographic characteristics.

BACKGROUND

Forensic data associated with a computing device may reveal a lot about a user associated with the device. The forensic data, which can include details regarding website history, viewed or captured images, viewed or captured audio, call history, messaging history, and more, can often be a valuable tool for law enforcement officers when a computing device is seized in the commission or investigation of a crime. However, in many instances, law enforcement officers may come across a computing device used in a crime without knowledge of the identity of any users of the device.

Some methods for identifying the user of a computing device based on forensic data can include looking up persons associated with information included in the analyzed data. For example, a law enforcement agency may identify a phone number or other identifier, such as an Internet Protocol address, associated with the device, and then find a person associated with that identifier, such as the person registered to a phone number. However, in many instances it may be difficult to such a person, such as when there may have been multiple users of a device or if the device was stolen prior to its use.

In addition, such data may be useful for identifying actions performed by a user of a computing device used in the commission of a crime before the computing device is seized. For example, law enforcement agencies may analyze the device's website browsing history to uncover additional clues or evidence. However, other useful information, particularly payment transactions conducted involving a user of the computing device, may be unavailable. While a law enforcement agency may be capable of identifying a payment card number if one is saved in the device, or view recent purchases if made online using the device, the agency may be unable to identify the full set of purchases associated with the user or payment account.

Thus, there is a need for a technical solution to link forensic data of a computing device with transaction history and purchase data, which may provide valuable information and insight to law enforcement agencies and other third parties regarding the actions and purchases made by users associated with the computing device.

SUMMARY

The present disclosure provides a description of systems and methods for linking forensic data to transaction history.

A method for linking forensic data to transaction history includes: storing, in a database, a plurality of consumer profiles, wherein each consumer profile includes data related to a consumer including at least a consumer identifier associated with the related consumer and a plurality of transaction data entries, each transaction data entry including data related to a payment transaction involving the related consumer including at least transaction data; receiving, by a receiving device, a forensic profile, wherein the forensic profile includes forensic data obtained from a computing device; identifying, by a processing device, at least a correspondence between the forensic data included in the received forensic profile and transaction data included in the transaction data entries stored in the plurality of consumer profiles to obtain at least a specific consumer identifier; identifying, in the database, a specific consumer profile where the included consumer identifier corresponds to the specific consumer identifier; and transmitting, by a transmitting device, at least the transaction data included in one or more transaction data entries included in the identified specific consumer profile.

Another method for linking forensic data to transaction history includes: storing, in a database, a plurality of consumer profiles, wherein each consumer profile includes data related to a consumer including at least a consumer identifier associated with the related consumer, a plurality of demographic characteristics associated with the related consumer, and a plurality of transaction data entries, each transaction data entry including data related to a payment transaction involving the related consumer including at least transaction data; receiving, by a receiving device, a forensic profile, wherein the forensic profile includes forensic data obtained from a computing device; identifying, by a processing device, at least a correspondence between the forensic data included in the received forensic profile and transaction data included in the transaction data entries stored in the plurality of consumer profiles to obtain at least a specific consumer identifier; identifying, in the database, a specific consumer profile where the included consumer identifier corresponds to the specific consumer identifier; and transmitting, by a transmitting device, at least the plurality of demographic characteristics associated with the related consumer included in the identified specific consumer profile.

Yet another method for linking forensic data to transaction history includes: storing, in a database, a plurality of consumer profiles, wherein each consumer profile includes data related to a consumer including at least a plurality of consumer characteristics associated with the related consumer and a plurality of transaction data entries each corresponding to a payment transaction involving the related consumer; receiving, by a receiving device, a forensic profile, wherein the forensic profile includes forensic data obtained from a computing device associated with a specific consumer and a plurality of demographic characteristics associated with the specific consumer; identifying, by a processing device, a specific consumer profile of the plurality of consumer profiles where at least a predefined number of the included plurality of consumer characteristics correspond to the plurality of demographic characteristics; and associating, in the database, the identified specific consumer profile with the forensic data included in the received forensic profile.

A system for linking forensic data to transaction history includes a database, a receiving device, a processing device, and a transmitting device. The database is configured to store a plurality of consumer profiles, wherein each consumer profile includes data related to a consumer including at least a consumer identifier associated with the related consumer and a plurality of transaction data entries, each transaction data entry including data related to a payment transaction involving the related consumer including at least transaction data. The receiving device is configured to receive a forensic profile, wherein the forensic profile includes forensic data obtained from a computing device. The processing device is configured to: identify a correspondence between the forensic data included in the received forensic profile and transaction data included in the transaction data entries stored in the plurality of consumer profiles to obtain at least a specific consumer identifier; and identify, in the database, a specific consumer profile where the included consumer identifier corresponds to the specific consumer identifier. The transmitting device is configured to transmit at least the transaction data included in one or more transaction data entries included in the identified specific consumer profile.

Another system for linking forensic data to transaction history includes a database, a receiving device, a processing device, and a transmitting device. The database is configured to store a plurality of consumer profiles, wherein each consumer profile includes data related to a consumer including at least a consumer identifier associated with the related consumer, a plurality of demographic characteristics associated with the related consumer, and a plurality of transaction data entries, each transaction data entry including data related to a payment transaction involving the related consumer including at least transaction data. The receiving device is configured to receive a forensic profile, wherein the forensic profile includes forensic data obtained from a computing device. The processing device is configured to: identify, by a processing device, at least a correspondence between the forensic data included in the received forensic profile and transaction data included in the transaction data entries stored in the plurality of consumer profiles to obtain at least a specific consumer identifier; and identify, in the database, a specific consumer profile where the included consumer identifier corresponds to the specific consumer identifier. The transmitting device is configured to transmit at least the plurality of demographic characteristics associated with the related consumer included in the identified specific consumer profile.

Yet another system for linking forensic data to transaction history includes a database, a receiving device, and a processing device. The database is configured to store a plurality of consumer profiles, wherein each consumer profile includes data related to a consumer including at least a plurality of consumer characteristics associated with the related consumer and a plurality of transaction data entries each corresponding to a payment transaction involving the related consumer. The receiving device is configured to receive a forensic profile, wherein the forensic profile includes forensic data obtained from a computing device associated with a specific consumer and a plurality of demographic characteristics associated with the specific consumer. The processing device is configured to: identify a specific consumer profile of the plurality of consumer profiles where at least a predefined number of the included plurality of consumer characteristics correspond to the plurality of demographic characteristics; and associate, in the database, the identified specific consumer profile with the forensic data included in the received forensic profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Personally identifiable information (PII)—PII may include information that may be used, alone or in conjunction with other sources, to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. The present disclosure provides for methods and systems where the processing server 108 does not require possessing any personally identifiable information. Systems and methods apparent to persons having skill in the art for rendering potentially personally identifiable information anonymous may be used, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the processing server 108 may not possess the PII or be able to decrypt the encrypted PII.

System for Linking Forensic Data to Transaction History

Figure 1:
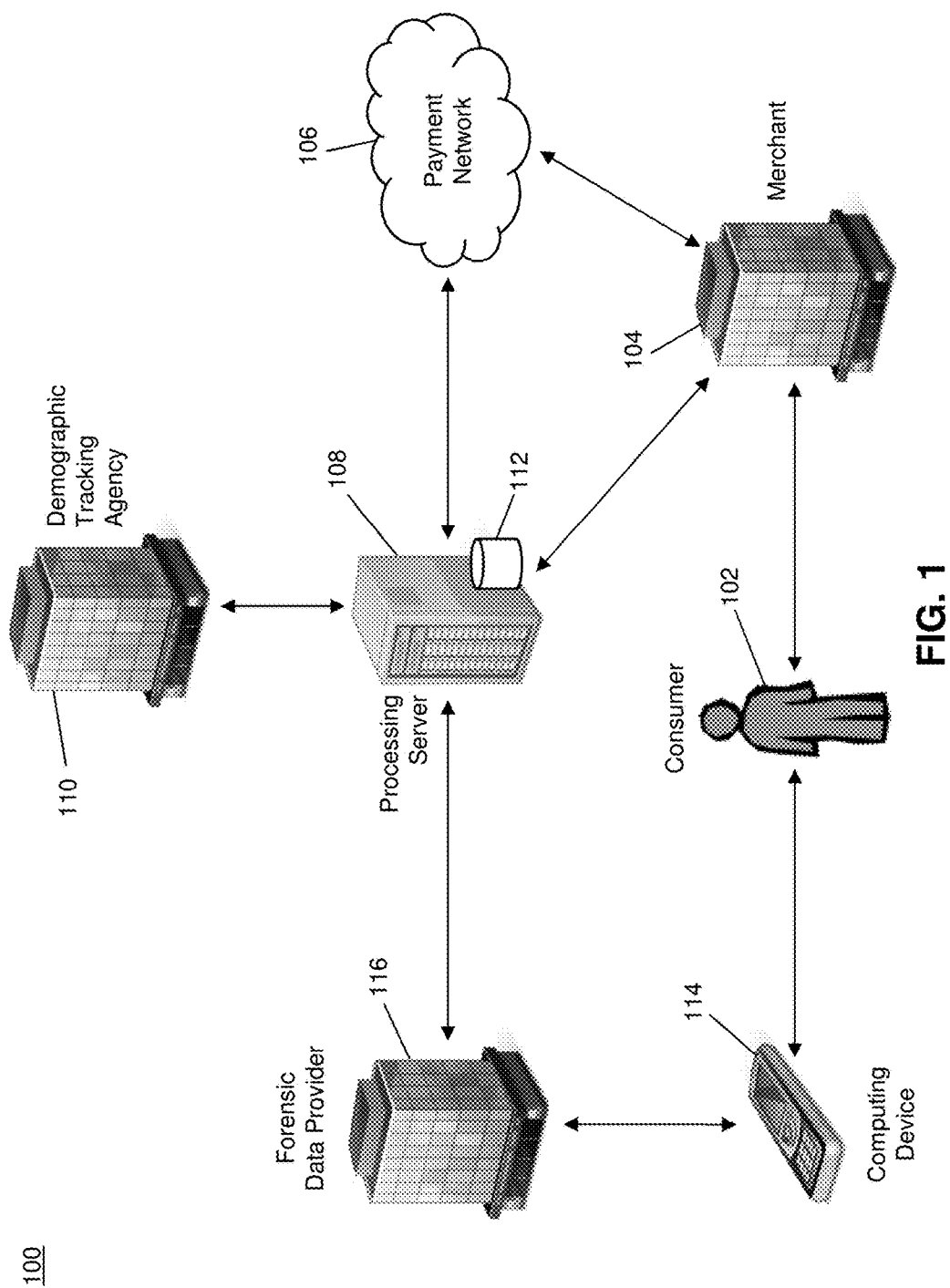
FIG. 1 is a high level architecture illustrating a system for linking computing device forensic data and transaction history in accordance with exemplary embodiments.

FIG. 1 illustrates a system 100 for linking computing device forensic data to consumer transaction history.

A consumer 102 may engage in one or more payment transactions at a merchant 104. The payment transaction or transactions may be conducted in person (e.g., at a physical location of the merchant 104), or remotely, such as via the Internet, telephone, by e-mail or regular mail, text messaging, etc. The transaction may be processed via a payment network 106. The payment network 106 may transmit a copy of the authorization request or transaction data included therein to a processing server 108, discussed in more detail below. The processing server 108 may store the transaction data in a consumer profile of a consumer database 112, also discussed in more detail below, associated with the consumer 102. In an exemplary embodiment, the transaction data may only be stored in a consumer profile associated with the particular consumer 102 with the permission of the consumer 102.

The processing server 108 may receive demographic characteristics associated with the consumer 102 from a demographic tracking agency 110 or other third party. The demographic characteristics may include: age, gender, income, marital status, familial status, residential status, occupation, education, zip code, postal code, street address, county, city, state, country, etc. The processing server 108 may store the demographic characteristics in the consumer profile associated with the consumer 102. In an exemplary embodiment, the consumer profile associated with the consumer 102 may not include any personally identifiable information. In some instances, the consumer 102 may be grouped with a plurality of consumers having similar or the same demographic characteristics.

The consumer 102 may possess a computing device 114. The computing device 114 may be any type of computing device suitable for performing the functions disclosed herein, such as a desktop computer, laptop computer, notebook computer, tablet computer, cellular phone, smart phone, personal digital assistant, etc. In some embodiments, any digital media associated with the consumer 102, such as compact discs, digital video discs, universal serial bus drives, etc. may be considered computing devices 114 for use in the methods and systems discussed herein.

The computing device 114 may be configured to store forensic data. Data that may comprise forensic data that may be obtained from the computing device 114 will be apparent to persons having skill in the relevant art and may include, documents, audio files, images, video files, browsing history, saved data, transaction data, cookies, etc. In some instances, the consumer 102 may use the computing device 114 to conduct payment transactions with merchants 104, which may be processed by the payment network 106, and transaction data provided to and stored by the processing server 108.

The system 100 may also include a forensic data provider 116. The forensic data provider 116 may be configured to obtain forensic data associated with the computing device 114. The forensic data provider 116 may be, for example, a law enforcement agency or entity operating on behalf thereof, which may collect forensic data from the computing device 114 as part of an investigation regarding criminal activity. For instance, a law enforcement agency may find the computing device 114 at a location where a crime was committed, and may use combinations of software and hardware to obtain forensic data stored and/or associated with the computing device 114.

The forensic data provider 116 may be configured to furnish the obtained forensic data to the processing server 108. As discussed in more detail below, the processing server 108 may then identify a consumer profile, or a plurality of profiles with an indication of how closely matching the forensic data matches the individual profiles, stored in the consumer database 112 that is associated with the forensic data, such as by using a consumer identifier or pattern of confirmed or possible transactions identified via analysis of the forensic data. The processing server 108 may then transmit data regarding payment transactions stored in the identified consumer profile to the forensic data provider 116 or other third party (e.g., a law enforcement agency) regarding transactions that may be associated with the computing device 114.

In one embodiment, the processing server 108 may be configured to furnish demographic characteristics to the forensic data provider 116 or other third party in response to received forensic data. For example, similar to the transaction data, the processing server 108 may match the forensic data with a consumer profile, and then transmit demographic characteristics included in the matched consumer profile to the forensic data provider 116 or other third party. It will be apparent to persons having skill in the relevant art that, while the demographic characteristics in the identified consumer profile may or may not be the same as a specific user of the computing device 114 from which the forensic data was captured, the demographic characteristics may still be useful in the identification or understanding of the specific user of the computing device 114.

In some embodiments, the forensic data provider 116 may provide forensic data to the processing server 108 associated with demographic characteristics corresponding to the computing device 114 associated with respective forensic data. For example, the forensic data provider 116 may provide the processing server 108 with the forensic data of a computing device 114 alleged to belong to a suspect with specific demographic characteristics, such as a specific gender, age range, and range of geographic locations. In such an embodiment, the processing server 108 may match the forensic data to one or more consumer profiles based on the demographic characteristics and the consumer characteristics of the one or more consumer profiles.

As discussed in more detail below, demographic and consumer characteristics may not include any personally identifiable information. Various techniques that will be apparent to persons having skill in the relevant art may be used to assure that such information is not personally identifiable, such as via bucketing, the use of microsegments, etc. The use of microsegments may result in linking forensic data to transaction data for a consumer 102 or computing device 114 that may not be the same exact consumer 102 or computing device 114 associated with the forensic data, but may be similar enough to the actual consumer 102 or computing device 114 to be beneficial for use by law enforcement agencies and other third parties. Additional detail regarding associating consumers based on consumer characteristics and the grouping of consumers for privacy of the consumers can be found in U.S. patent application Ser. No. 13/437,987, entitled "Protecting Privacy in Audience Creation," to Curtis Villars et al., filed Apr. 3, 2012, which is herein incorporated by reference in its entirety.

Processing Server

Figure 2:
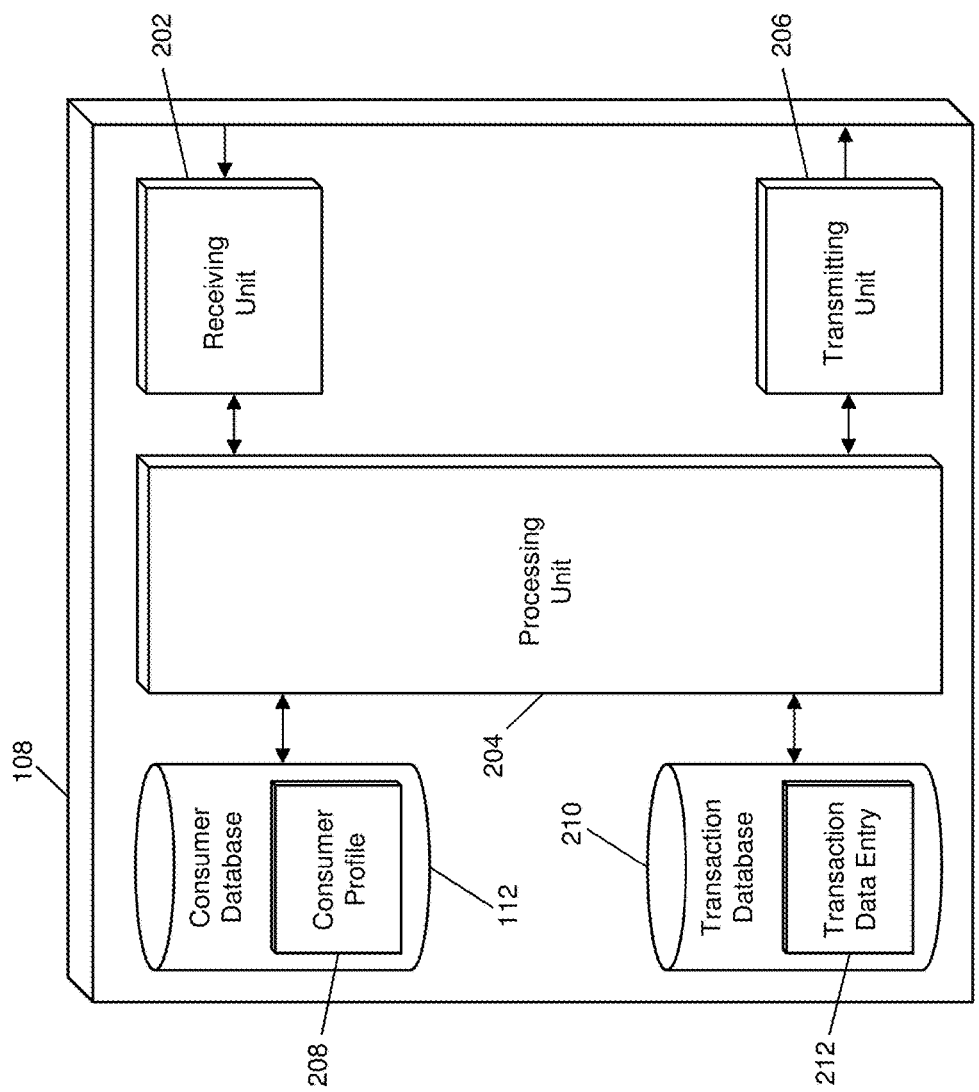
FIG. 2 is a block diagram illustrating the processing server of FIG. 1 for the linking of computing device forensic data and transaction history in accordance with exemplary embodiments.

FIG. 2 illustrates an embodiment of the processing server 108 of the system 100. It will be apparent to persons having skill in the relevant art that the embodiment of the processing server 108 illustrated in FIG. 2 is provided as illustration only and may not be exhaustive to all possible configurations of the processing server 108 suitable for performing the functions as discussed herein. For example, the computer system 900 illustrated in FIG. 9 and discussed in more detail below may be a suitable configuration of the processing server 108.

The processing server 108 may include a receiving unit 202. The receiving unit 202 may be configured to receive data over one or more networks via one or more network protocols. The receiving unit 202 may be configured to receive transaction data, demographic characteristic data, and forensic data.

The processing server 108 may also include a processing unit 204. The processing unit 204 may be configured to store received transaction data in a transaction database 210 as one or more transaction data entries 212. Each transaction data entry 212 may include data related to a corresponding payment transaction, such as a consumer identifier, merchant identifier, transaction amount, transaction time and/or date, geographic location, merchant name, product data, coupon or offer data, a point-of-sale identifier, or other suitable information as will be apparent to persons having skill in the relevant art. In one embodiment, each transaction data entry may also include demographic characteristics for a consumer (e.g., consumer characteristics) involved in the corresponding payment transaction.

The processing unit 204 may also be configured to store a plurality of consumer profiles 208 in the consumer database 112. Each consumer profile 208 may include data related to a consumer (e.g., the consumer 102), including at least a plurality of consumer characteristics. In some instances, the consumer characteristics may include at least demographic characteristics. In some embodiments, each consumer profile 208 may also include a plurality of transaction data entries 212. In an exemplary embodiment, each consumer profile 208 might not be permitted to include personally identifiable information unless expressly consented to by the corresponding consumer 102. In some embodiments, each consumer profile 208 may be associated with a specific set of consumer characteristics and may accordingly be related to a generic consumer of those characteristics rather than an actual consumer 102.

The processing unit 204 may be configured to link consumer profiles 208 with transaction data entries 212 based on demographic characteristics. The processing unit 204 may also be configured to link consumer profiles 208 including transaction data entries 212 with forensic data received by the receiving unit 202. The processing unit 204 may be configured to link the consumer profiles 208 with the forensic data via demographic characteristics included in the consumer profiles 208 and in the received forensic data. In some instances, the processing unit 204 may match forensic data to transaction history based on a predefined number of demographic characteristics (e.g., at least the predefined number of characteristics must match). In other instances, transaction history and forensic data may be matched via algorithms or other systems and methods that will be apparent to persons having skill in the relevant art. In some embodiments, the processing unit 204 may store the received forensic data in the linked consumer profile 208.

The processing server 108 may also include a transmitting unit 206. The transmitting unit 206 may be configured to transmit data over one or more networks via one or more network protocols. The transmitting unit 206 may be configured to transmit requests for data, such as to the demographic tracking agency 110 and/or the forensic data provider 116. The transmitting unit 206 may also be configured to transmit transaction history, demographic characteristics, and/or forensic data, or a consumer profile 208 including linked transaction history and forensic data, in response to a request from a third party (e.g., a law enforcement agency).

The processing unit 204 may be further configured to analyze received forensic data. Analysis of received forensic data may be done to identify a consumer identifier. For example, transaction data for a payment transaction may include a payment account number, which may correspond to a consumer identifier in a consumer profile 208 stored in the consumer database 112. In some embodiments, analysis may include identifying a correspondence between the received forensic data and transaction data included in transaction data entries stored in the consumer profiles 208. For example, the forensic data may reveal a history of transactions conducted using the associated computing device 114, such as by providing dates, times, and merchants 104 for online transactions. The processing unit 204 may match these transactions with transaction data entries stored in consumer profiles 208 and identify a consumer profile 208 that matches the received forensic data. The corresponding transaction data and/or demographic characteristics included in the identified consumer profile 208 may then be transmitted to a third party by the transmitting unit 206, such as in response to a request for such data accompanying the forensic data.

Method for Linking Forensic Data to Transaction History

Figure 3:
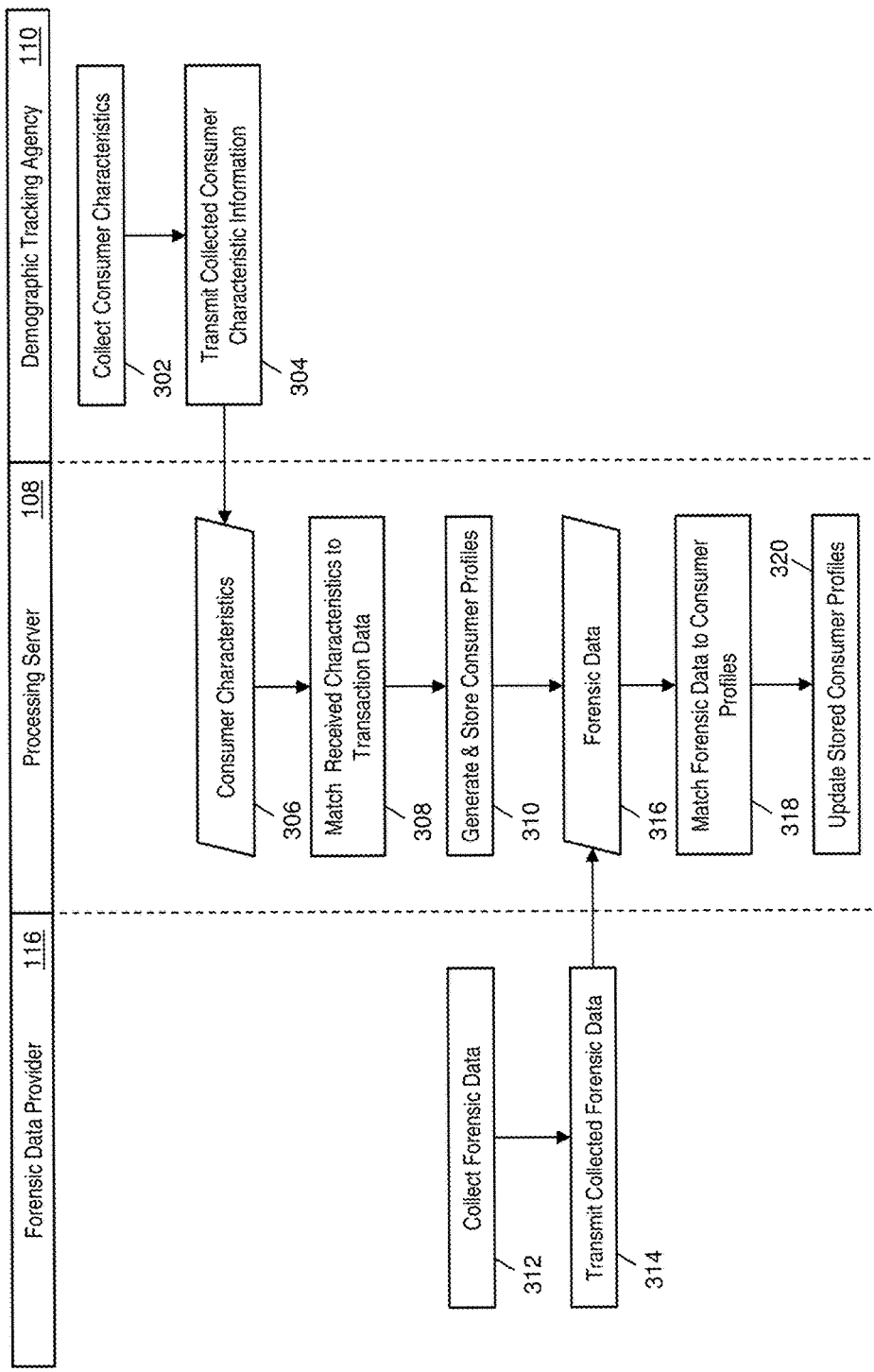
FIG. 3 is a flow diagram illustrating a method for linking forensic data with transaction history using consumer characteristics in accordance with exemplary embodiments.

FIG. 3 illustrates a method for linking forensic data to transaction history.

In step 302, the demographic tracking agency 110 may collect demographic characteristics for one or more consumers. Methods and systems for collecting demographic characteristics will be apparent to persons having skill in the relevant art. The demographic tracking agency 110 may collect the information and may, in step 304, transmit the collected demographic characteristic information to the processing server 108.

In step 306, the processing server 108 may receive the demographic characteristic information. In step 308, the processing unit 204 of the processing server 108 may match the received demographic characteristic information to transaction data entries 212 included in the transaction database 210. In step 310, the processing unit 204 may generate consumer profiles 208 for matched transaction history and demographic characteristics (e.g., consumer characteristics) and store the consumer profiles 208 in the consumer database 112. In an exemplary embodiment, the processing unit 204 may bucket or otherwise modify the consumer characteristic information and/or transaction data to render the corresponding consumer profile 208 not personally identifiable. In some instances, the processing unit 204 may group transaction data entries 212 for multiple consumers sharing consumer characteristics into a single consumer profile 208.

In step 312, the forensic data provider 116 may collect forensic data from a computing device 114. In some embodiments, the forensic data may be associated with a plurality of demographic characteristics that are associated with a consumer 102. In step 314, the forensic data provider 116 may transmit the forensic data, and, if applicable, demographic characteristics, to the processing server 108. The processing server 108 may, in step 316, receive the forensic data from the forensic data provider 116.

In step 318, the processing unit 204 of the processing server 108 may match the received forensic data to the consumer profiles 208. In one embodiment, the matching may be based on matching of the demographic and consumer characteristics. In another embodiment, matching may be based on correspondence between the forensic data and transaction data stored in the consumer profiles 208. Once a consumer profile 208 has been matched to the forensic data, then, in step 320, the processing unit 320 may update the matched consumer profile 208 to include and/or be associated with the matched forensic data.

Method for Providing Linked Transaction History

Figure 4:
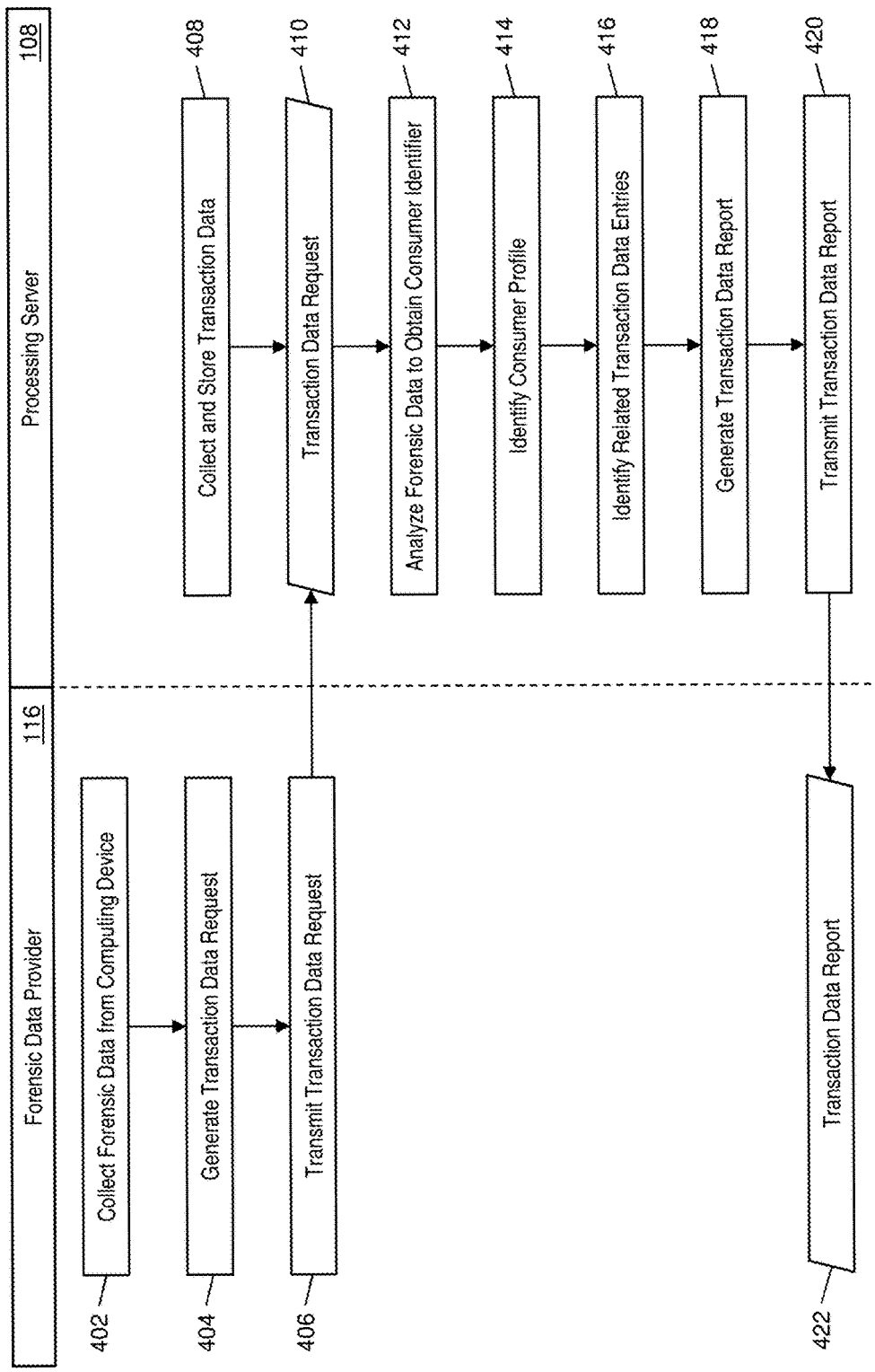
FIG. 4 is a flow diagram illustrating a method for generating a report of conducted transactions based on linked forensic data in accordance with exemplary embodiments.

FIG. 4 illustrates a method for providing a data report of transaction history linked to forensic data.

In step 402, the forensic data provider 116 may collect forensic data from the computing device 114. In step 404, the forensic data provider 116 may generate a transaction data request. The transaction data request may include the collected forensic data and may further include a period of time, one or more spending behaviors, one or more merchant identifiers, or other criteria that may be used for analysis and/or filtering of transaction data. For example, the forensic data provider 116 may be requesting transaction data associated with the computing device 114 for a specific period of time and at a specific list of merchants, such as for use in an investigation.

In step 406, the forensic data provider 116 may transmit the transaction data request including the forensic data and any requesting criteria to the processing server 108. In step 408, the processing unit 204 of the processing server 108 may collect and store transaction data, such as in the transaction database 210 and/or the consumer database 112. In step 410, the receiving unit 202 of the processing server 108 may receive the transaction data request.

In step 412, the processing unit 204 may analyze the received forensic data to obtain a consumer identifier. In one embodiment, the consumer identifier may be analyzed directly from the forensic data, such as by mining the forensic data to locate the consumer identifier stored there. For example, the consumer identifier may be stored in one or more browsing cookies or in an e-mail message. In another embodiment, the consumer identifier may be identified based on a correspondence between the forensic data and the stored transaction data. For instance, the processing unit 204 may correlate actual or possible transactions by date and time based on the forensic data, such as using dates and times a web browsing application program was used to visit e-commerce sites, to actual transaction data stored in a consumer profile 208. The correlation might indicate a degree of correlation (e.g., represented as a score representing the likelihood of a match), and, based on the degree of correlation, may indicate that the forensic data matches or has sufficient similarity to a consumer profile 208 and identification of the consumer identifier thereof.

Once the consumer identifier has been identified, then, in step 414, the processing unit 204 may identify the consumer profile 208 in the consumer database 112 that includes the identified consumer identifier. In step 416, the processing unit 204 may identify transaction data entries associated with the identified consumer profile 208, such as included in the consumer profile 208 or stored in the transaction database 210 as transaction data entries 212 and including the consumer identifier.

In step 418, the processing unit 204 may generate a transaction data report. The transaction data report may include data and/or analysis based on the identified transaction data. In instances where the received transaction data request includes requested criteria, the transaction data report may include data corresponding to the requested criteria. For example, if the transaction data request includes a request for spending behaviors, the processing unit 204 may identify spending behaviors based on the transaction data for inclusion in the transaction data report. Once the report has been generated, then, in step 420, the transmitting unit 206 of the processing server 108 may transmit the generated transaction data report to the forensic data provider 116, which may receive the report in step 422.

In some embodiments, steps 416 through 422 may include the identification and providing of demographic characteristics in addition to, or alternative to, transaction data. For example, in step 416, the processing unit 204 may identify a plurality of demographic characteristics stored in the identified consumer profile 208 and associated with the related consumer. Then, in step 418, a report regarding the demographic characteristics may be generated and transmitted to the forensic data provider 116, in step 420. In such an embodiment, the method illustrated in FIG. 4 may be used to identify and provide possible demographic characteristics of a user of the computing device 114 based on retrieved forensic data.

Linking Forensic Data to Transaction History

Figure 5:
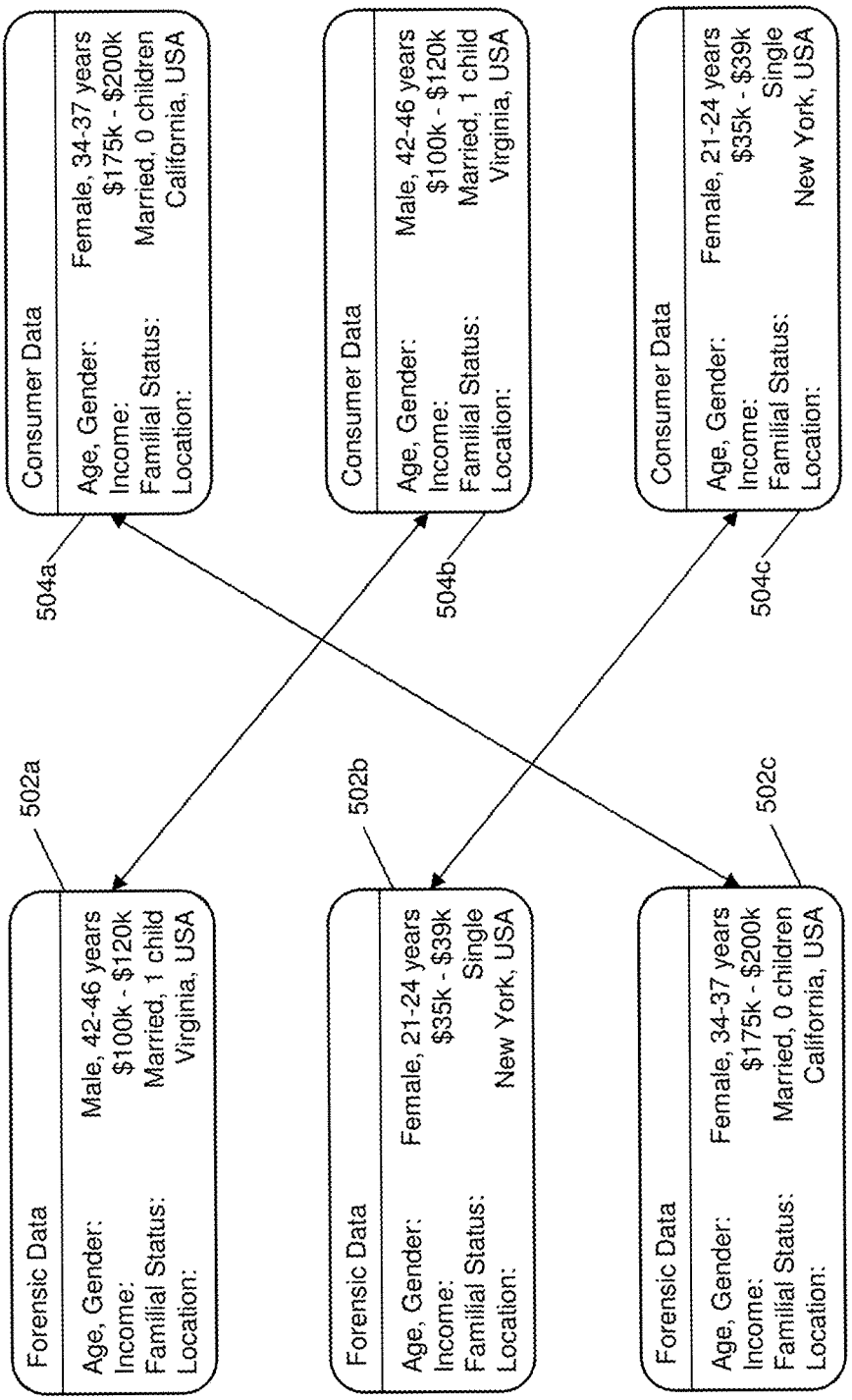
FIG. 5 is a diagram illustrating the linking of forensic data to transaction history using consumer characteristics in accordance with exemplary embodiments.

FIG. 5 illustrates the linking of forensic data 502 to transaction history 504 using demographic characteristics.

Each set of forensic data 502, illustrated in FIG. 5 as forensic data 502a, 502b, and 502c, may correspond to a consumer 102 and include a plurality of demographic characteristics. For example, forensic data 502a corresponds to a consumer 102 that is a male, of an age between 42 and 46 years old, has an income between $100,000 and $120,000, is married, has one child, and lives in Virginia. In some embodiments, the forensic data 502a may correspond to a plurality of consumers each having the same demographic characteristics data.

Each set of transaction data 504, illustrated in FIG. 5 as transaction data 504a, 504b, and 504c, may correspond to a consumer 102 or a plurality of consumers 102, and include a plurality of consumer characteristics associated with the corresponding consumer or consumers 102. For example, transaction data 504a may correspond to a consumer 102 that is a female, of an age between 34 and 37 years old, has an income between $175,000 and $200,000, is married, has no children, and lives in California.

The processing unit 204 of the processing server 108 may identify the demographic characteristics for each of the forensic data 502 and transaction data 504 and match the two sets of data based on common demographic and consumer characteristics. For example, in the example illustrated in FIG. 5, the processing unit 204 may match forensic data 502a with transaction data 504b, forensic data 502b with transaction data 504c, and forensic data 502c with transaction data 504a. The processing unit 204 may then store the linked data in one or more consumer profiles 208 including the corresponding consumer characteristics.

In some embodiments, the demographic characteristics for the forensic data 502 may not directly correspond to the consumer characteristics for the transaction data 504. In such an instance, the processing unit 204 may be configured to link the data based on a predefined number of matching characteristics. For example, if the transaction data 504b was associated with a consumer 102 having two children (instead of one child as illustrated in FIG. 5), while the forensic data 502a is associated with a consumer 102 having only one child, the processing unit 204 may still link the two sets of data because the sets have at least five matching demographic characteristics including age, gender, income, marital status, and geographic location.

First Exemplary Method for Linking Forensic Data to Transaction History

Figure 6:
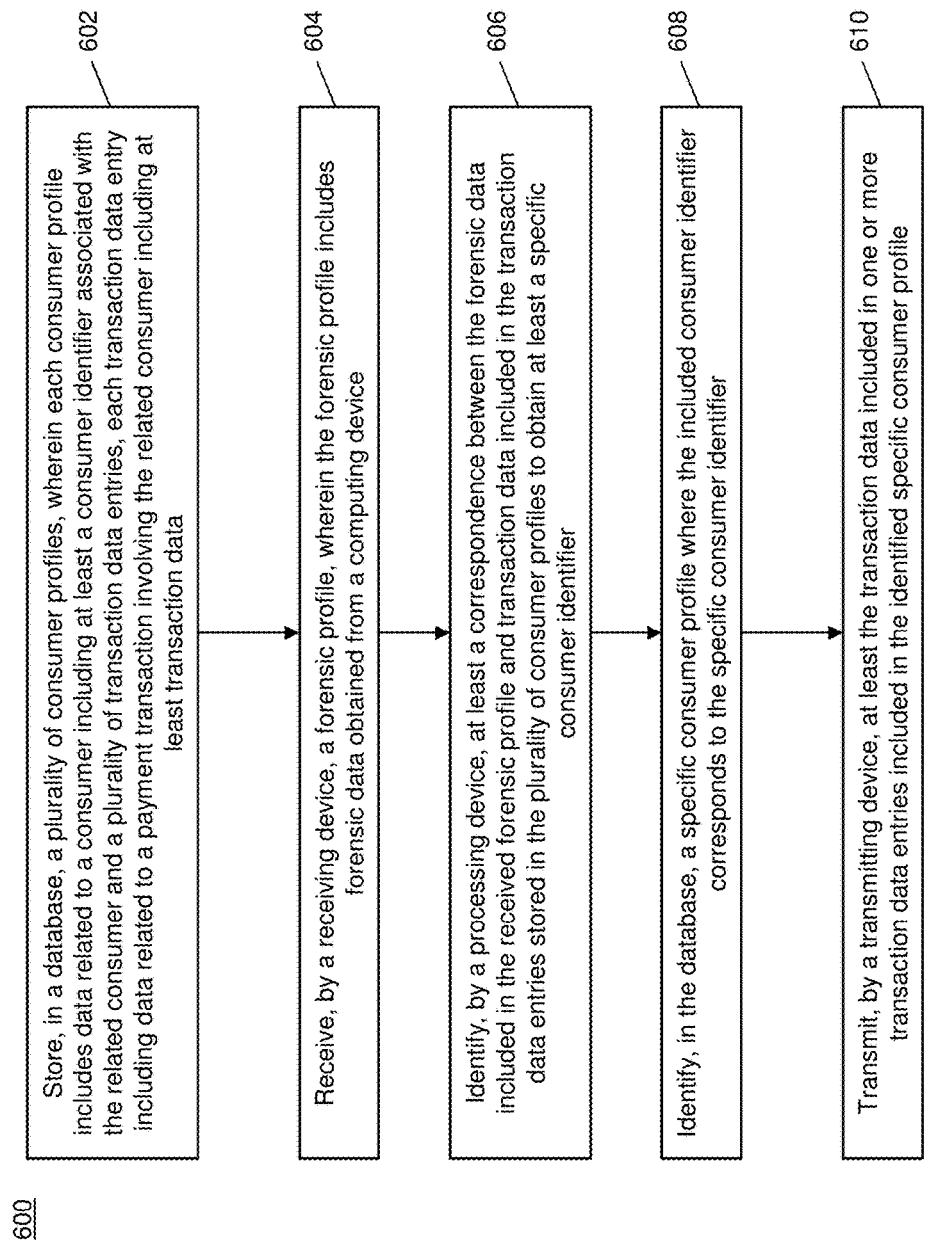
FIGS. 6-8 are flow charts illustrating exemplary methods for linking computing device forensic data to transaction history in accordance with exemplary embodiments.

FIG. 6 illustrates a method 600 for linking forensic data obtained from a computing device to transaction history.

In step 602, a plurality of consumer profiles (e.g., consumer profiles 208) may be stored in a consumer database (e.g., the consumer database 112), wherein each consumer profile 208 includes data related to a consumer (e.g., the consumer 102) including at least a consumer identifier associated with the related consumer 102 and a plurality of transaction data entries, each transaction data entry including data related to a payment transaction involving the related consumer 102 including at least transaction data. In one embodiment, the consumer identifier may be at least one of: a payment account number, a name, a username, an e-mail address, a phone number, an internet protocol address, a media access control address, and a set of consumer characteristics.

In step 604, a forensic profile may be received by a receiving device (e.g., the receiving unit 202), wherein the forensic profile includes forensic data obtained from a computing device (e.g., the computing device 114). In one embodiment, the forensic data may include at least one of: call data, application program data, short message service data, multimedia message service data, e-mail data, and geographic location data.

In step 606, a processing device (e.g., the processing unit 204) may identify at least a correspondence between the forensic data included in the received forensic profile and transaction data included in the transaction data entries stored in the plurality of consumer profiles 208 to obtain at least a specific consumer identifier.

In step 608, a specific consumer profile 208 may be identified in the consumer database 112 where the included consumer identifier corresponds to the specific consumer identifier. In step 610, at least the transaction data included in one or more transaction data entries included in the identified specific consumer profile 208 may be transmitted by a transmitting device (e.g., the transmitting unit 206).

In one embodiment, the forensic profile may be included in a data request that further includes a period of time, and the method 600 may further include identifying, in the specific consumer profile 208, a subset of the plurality of transaction data entries where the included transaction data includes a transaction time and/or date within the period of time, wherein the one or more transaction data entries are the identified subset of the plurality of transaction data entries.

In some embodiments, the method 600 may further include generating, by the processing device 204, a report based on at least the transaction data included in one or more transaction data entries included in the specific consumer profile 208, wherein transmitting at least the transaction data included in one or more transaction data entries included in the identified specific consumer profile 208 includes transmitting the generated report based on the transaction data included in one or more transaction data entries included in the specific consumer profile 208.

Second Exemplary Method for Linking Forensic Data to Transaction History

Figure 7:
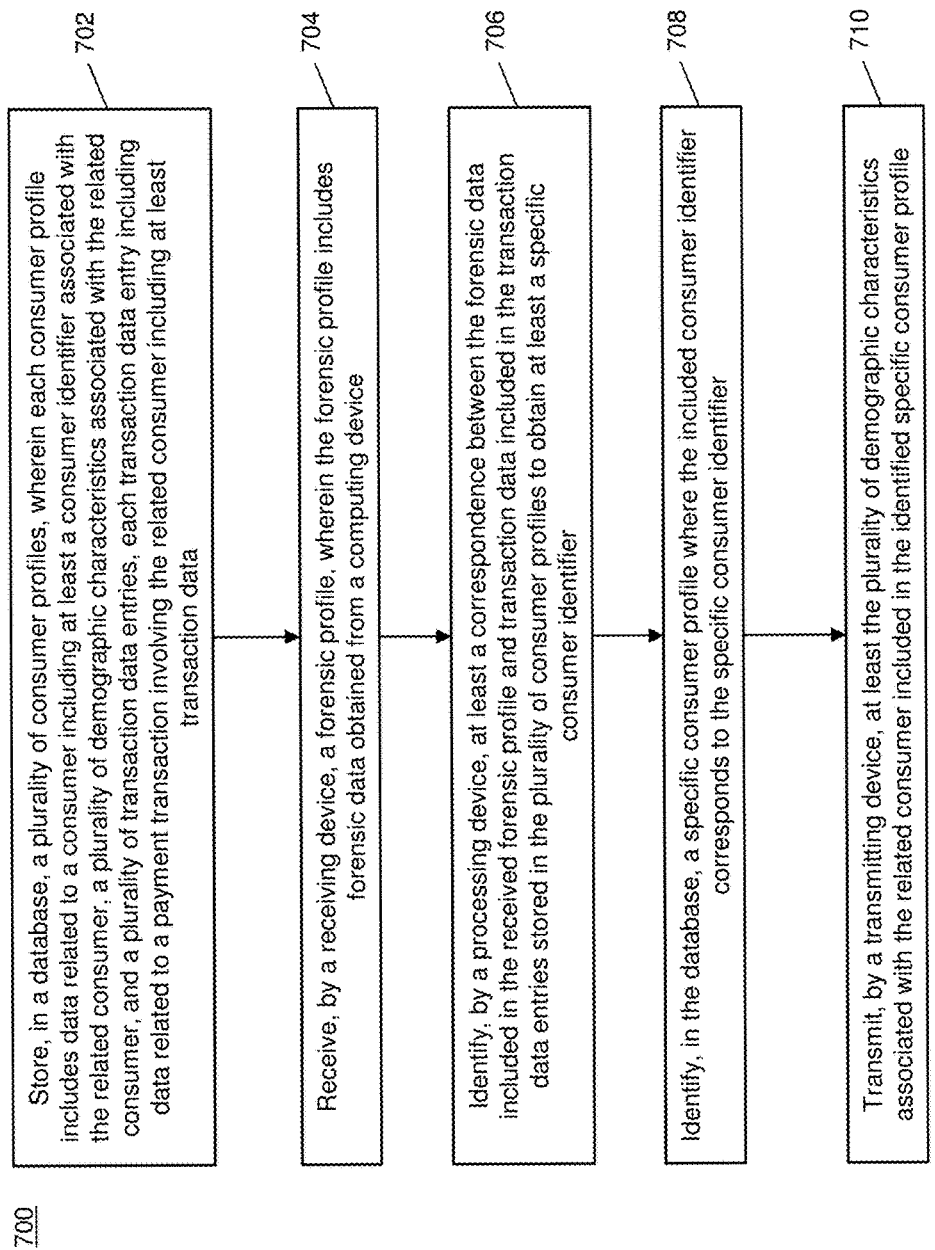

FIG. 7 illustrates a method 700 for linking forensic data obtained from a computing device to transaction history.

In step 702, a plurality of consumer profiles (e.g., consumer profiles 208) may be stored in a consumer database (e.g., the consumer database 112), wherein each consumer profile 208 includes data related to a consumer (e.g., the consumer 102) including at least a consumer identifier associated with the related consumer 102, a plurality of demographic characteristics associated with the related consumer 102, and a plurality of transaction data entries, each transaction data entry including data related to a payment transaction involving the related consumer 102 including at least transaction data. In one embodiment, the consumer identifier may be at least one of: a payment account number, a name, a username, an e-mail address, a phone number, an internet protocol address, a media access control address, and a set of consumer characteristics. In some embodiments, the plurality of demographic characteristics may include at least one of: age, gender, income, residential status, marital status, familial status, occupation, education, geographic location, postal code, zip code, and street address In step 704, a forensic profile may be received by a receiving device (e.g., the receiving unit 202), wherein the forensic profile includes forensic data obtained from a computing device (e.g., the computing device 114). In one embodiment, the forensic data may include at least one of: call data, application program data, short message service data, multimedia message service data, e-mail data, and geographic location data. In step 706, a processing device (e.g., the processing unit 204) may identify at least a correspondence between the forensic data included in the received forensic profile and transaction data included in the transaction data entries stored in the plurality of consumer profiles 208 to obtain at least a specific consumer identifier.

In step 708, a specific consumer profile 208 may be identified in the consumer database 112 where the included consumer identifier corresponds to the specific consumer identifier. In step 710, at least the plurality of demographic characteristics associated with the related consumer included in the identified specific consumer profile may be transmitted by a transmitting device (e.g., the transmitting unit 206).

Third Exemplary Method for Linking Forensic Data to Transaction History

Figure 8:
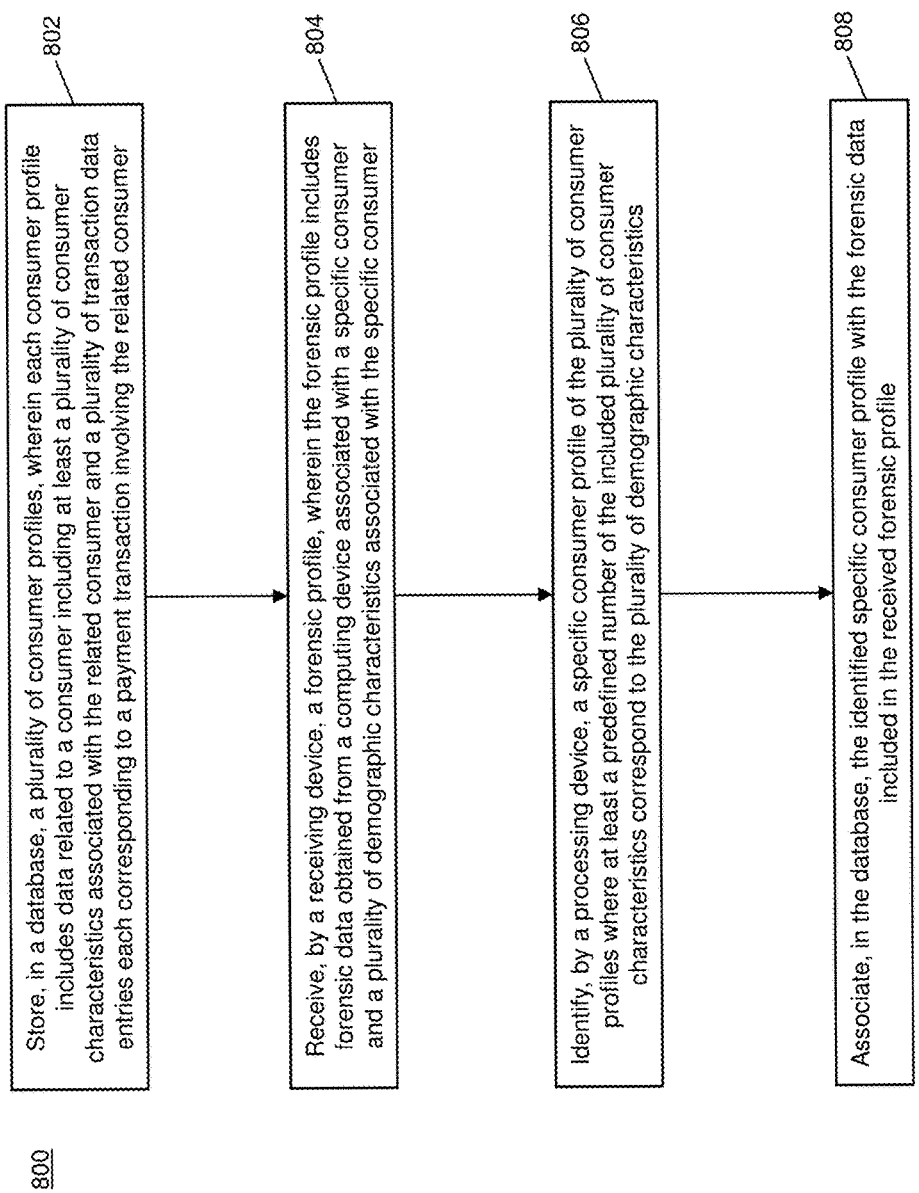

FIG. 8 illustrates a method 800 for linking forensic data obtained from a computing device to transaction history.

In step 802, a plurality of consumer profiles (e.g., consumer profiles 208) may be stored in a database (e.g., the consumer database 112), wherein each consumer profile 208 includes data related to a consumer (e.g., the consumer 102) including at least a plurality of consumer characteristics associated with the related consumer 102 and a plurality of transaction data entries each corresponding to a payment transaction involving the related consumer 102. In one embodiment, the plurality of consumer characteristics may include at least one of: age, gender, income, marital status, familial status, residential status, occupation, education, zip code, postal code, street address, county, city, state, and country.

In some embodiments, each transaction data entry may include at least transaction data, a consumer identifier associated with the related consumer 102, and a merchant identifier associated with a merchant (e.g., the merchant 104) involved in the corresponding payment transaction. In a further embodiment, the transaction data may include at least one of: a transaction amount, product data, transaction time and/or date, geographic location, coupon data, and point-of-sale identifier.

In step 804, a forensic profile may be received by a receiving device (e.g., the receiving unit 202), wherein the forensic profile includes forensic data obtained from a computing device (e.g., the computing device 114) associated with a specific consumer 102 and a plurality of demographic characteristics associated with the specific consumer 102. In one embodiment, the plurality of consumer characteristic and demographic characteristics may not be personally identifiable.

In step 806, a processing device (e.g., the processing unit 204) may identify a specific consumer profile 208 of the plurality of consumer profiles 208 where at least a predefined number of the included plurality of consumer characteristics correspond to the plurality of demographic characteristics. In step 808, the identified specific consumer profile 208 may be associated, in the database 112, with the forensic data included in the received forensic profile.

Computer System Architecture

Figure 9:
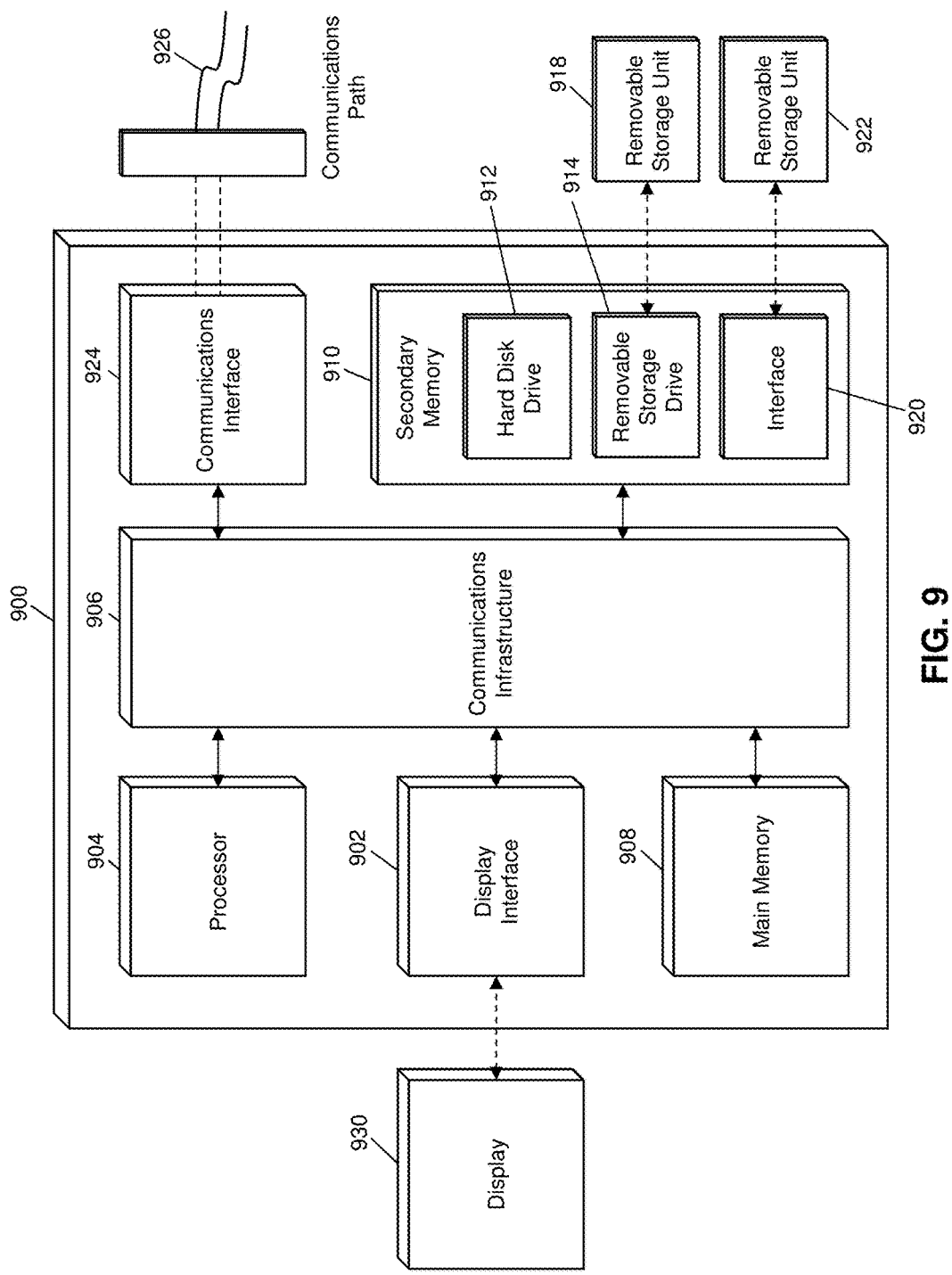
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the processing server 108 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4, and 6-8.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. The processor device 904 may be connected to a communications infrastructure 906, such as a bus, message queue, network, multi-core messagepassing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3, 4, and 6-8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

Techniques consistent with the present disclosure provide, among other features, systems and methods for linking forensic data to transaction history. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for linking forensic data to transaction history, comprising:
   receiving, by a receiving device of a processing server, from a financial transaction network, a plurality of payment transaction data related to payment transactions processed by said financial transaction network;
   storing, in a database device of the processing server, a plurality of consumer profiles,
      wherein each consumer profile includes consumer data, said consumer data including at least a consumer identifier associated with a related consumer and a plurality of transaction data entries, each transaction data entry including payment transaction data, received from the financial transaction network, related to a payment transaction involving the related consumer,
      wherein all personally-identifiable information (PII) of consumers associated with each consumer profile of the plurality of consumer profiles is encrypted to render said PII unidentifiable, said encryption mode being a one-way encryption, and
      wherein said processing server stores the one-way encrypted PII and cannot decrypt said one-way encrypted PII;
   receiving, by the receiving device of the processing server, a forensic profile, wherein the forensic profile includes forensic data obtained from a computing device;
   identifying, by a processing device of the processing server, at least a correspondence between the forensic data included in the received forensic profile and transaction data included in the transaction data entries stored in the plurality of consumer profiles to obtain at least a specific consumer identifier;
   identifying, in the database of the processing server, a specific consumer profile where the included consumer identifier corresponds to the specific consumer identifier; and
   transmitting, by a transmitting device of the processing server, at least the transaction data included in one or more transaction data entries included in the identified specific consumer profile.

2. The method of claim 1, wherein
   the forensic profile is included in a data request,
   the data request further includes a period of time, and
   the method further comprises:
   identifying, in the specific consumer profile, a subset of the plurality of transaction data entries where the included transaction data includes a transaction time and/or date within the period of time, wherein
   the one or more transaction data entries are the identified subset of the plurality of transaction data entries.

3. The method of claim 1, wherein the consumer identifier is at least one of: a payment account number, a name, a username, an e-mail address, a phone number, an interne protocol address, a media access control address, and a set of consumer characteristics.

4. The method of claim 1, wherein the forensic data includes at least one of:
   call data, application program data, short message service data, multimedia message service data, e-mail data, and geographic location data.

5. The method of claim 1, further comprising:
   generating, by the processing device, a report based on at least the transaction data included in one or more transaction data entries included in the specific consumer profile, wherein
   transmitting at least the transaction data included in one or more transaction data entries included in the identified specific consumer profile includes transmitting the generated report based on the transaction data included in one or more transaction data entries included in the specific consumer profile.

6. A computer-implemented method for linking forensic data to transaction history, comprising:
   receiving, by a receiving device of a processing server, from a financial transaction network, a plurality of payment transaction data related to payment transactions processed by said financial transaction network;
   storing, in a database of a processing server, a plurality of consumer profiles,
      wherein each consumer profile includes data related to a consumer including at least a plurality of consumer characteristics associated with the related consumer and a plurality of transaction data entries each corresponding to a payment transaction involving the related consumer and including payment transaction data received from the financial transaction network,
      wherein all personally-identifiable information (PII) of consumers associated with each consumer profile of the plurality of consumer profiles is encrypted to render said PII unidentifiable, said encryption mode being a one-way encryption, and wherein said processing server stores the one-way encrypted PII and cannot decrypt said one-way encrypted PII;

receiving, by the receiving device of the processing server, a forensic profile, wherein the forensic profile includes forensic data obtained from a computing device associated with a specific consumer and a plurality of demographic characteristics associated with the specific consumer;

identifying, by a processing device of the processing server, a specific consumer profile of the plurality of consumer profiles where at least a predefined number of the included plurality of consumer characteristics correspond to the plurality of demographic characteristics; and associating, in the database of the processing server, the identified specific consumer profile with the forensic data included in the received forensic profile.

7. The method of claim 6, wherein the consumer identifier is at least one of: a payment account number, a name, a username, an e-mail address, a phone number, an internet protocol address, a media access control address, and a set of consumer characteristics.

8. The method of claim 6, wherein the forensic data includes at least one of: call data, application program data, short message service data, multimedia message service data, e-mail data, and geographic location data.

9. The method of claim 6, wherein the plurality of consumer characteristics includes at least one of: age, gender, income, residential status, marital status, familial status, occupation, education, geographic location, postal code, zip code, and street address.

10. A computer-implemented method for linking forensic data to transaction history, comprising:

receiving, by a receiving device of a processing server, from a financial transaction network, a plurality of payment transaction data related to payment transactions processed by said financial transaction network;

storing, in a database of a processing server, a plurality of consumer profiles, wherein each consumer profile includes data related to a consumer including at least a plurality of consumer characteristics associated with the related consumer and a plurality of transaction data entries each corresponding to a payment transaction involving the related consumer and including payment transaction data received from the financial transaction network, wherein all personally-identifiable information (PII) of consumers associated with each consumer profile of the plurality of consumer profiles is encrypted to render said PII unidentifiable, said encryption mode being a one-way encryption, and wherein said processing server stores the one-way encrypted PII and cannot decrypt said one-way encrypted PII;

receiving, by a receiving device of the processing server, a forensic profile, wherein the forensic profile includes forensic data obtained from a computing device associated with a specific consumer and a plurality of demographic characteristics associated with the specific consumer;

identifying, by a processing device of the processing server, a specific consumer profile of the plurality of consumer profiles where at least a predefined number of the included plurality of consumer characteristics correspond to the plurality of demographic characteristics; and associating, in the database of the processing server, the identified specific consumer profile with the forensic data included in the received forensic profile.

11. The method of claim 10, wherein the plurality of consumer characteristics includes at least one of: age, gender, income, marital status, familial status, residential status, occupation, education, zip code, postal code, street address, county, city, state, and country.

12. The method of claim 10, wherein each transaction data entry includes at least transaction data, a consumer identifier associated with the related consumer, and a merchant identifier associated with a merchant involved in the corresponding payment transaction.

13. The method of claim 12, wherein the transaction data includes at least one of: a transaction amount, product data, transaction time and/or date, geographic location, coupon data, and point-of-sale identifier.

14. A system for linking forensic data to transaction history, comprising:

a receiving device, of a processing server, configured to receive, from a financial transaction network, a plurality of payment transaction data related to payment transactions processed by said financial transaction network;

a database, of the processing server, configured to store a plurality of consumer profiles, wherein each consumer profile includes data related to a consumer including at least a consumer identifier associated with the related consumer and a plurality of transaction data entries, each transaction data entry including payment transaction data, received from the financial transaction network, related to a payment transaction involving the related consumer, wherein all personally-identifiable information (PII) of consumers associated with each consumer profile of the plurality of consumer profiles is encrypted to render said PII unidentifiable, said encryption mode being a one-way encryption, and wherein said processing server stores the one-way encrypted PII and cannot decrypt said one-way encrypted PII;

a receiving device, of the processing server, configured to receive a forensic profile, wherein the forensic profile includes forensic data obtained from a computing device;

a processing device, of the processing server, configured to identify a correspondence between the forensic data included in the received forensic profile and transaction data included in the transaction data entries stored in the plurality of consumer profiles to obtain at least a specific consumer identifier, and identify, in the database, a specific consumer profile where the included consumer identifier corresponds to the specific consumer identifier; and a transmitting device, of the processing server, configured to transmit at least the transaction data included in one or more transaction data entries included in the identified specific consumer profile.

15. The system of claim 14, wherein the forensic profile is included in a data request, the data request further includes a period of time, the processor is further configured to identify, in the specific consumer profile, a subset of the plurality of transaction data entries where the included transaction data includes a transaction time and/or date within the period of time, and the one or more transaction data entries are the identified subset of the plurality of transaction data entries.

16. The system of claim 14, wherein the consumer identifier is at least one of: a payment account number, a name, a username, an e-mail address, a phone number, an internet protocol address, a media access control address, and a set of consumer characteristics.

17. The system of claim 14, wherein the forensic data includes at least one of: call data, application program data, short message service data, multimedia message service data, e-mail data, and geographic location data.

18. The system of claim 14, wherein the processing device is further configured to generate a report based on at least the transaction data included in one or more transaction data entries included in the specific consumer profile, and transmitting at least the transaction data included in one or more transaction data entries included in the identified specific consumer profile includes transmitting the generated report based on the transaction data included in one or more transaction data entries included in the specific consumer profile.

19. A system for linking forensic data to transaction history, comprising:

a receiving device, of a processing server, configured to receive (1) from a financial transaction network, a plurality of payment transaction data related to payment transactions processed by said financial transaction network and (2) a forensic profile, wherein the forensic profile includes forensic data obtained from a computing device;

a database, of the processing server, configured to store a plurality of consumer profiles, wherein each consumer profile includes data related to a consumer including at least a consumer identifier associated with the related consumer, a plurality of demographic characteristics associated with the related consumer, and a plurality of transaction data entries, each transaction data entry including payment transaction data, received from the financial transaction network, related to a payment transaction involving the related consumer, wherein all personally-identifiable information (PII) of consumers associated with each consumer profile of the plurality of consumer profiles is encrypted to render said PII unidentifiable, said encryption mode being a one-way encryption, and wherein said processing server stores the one-way encrypted PII and cannot decrypt said one-way encrypted PII;

a processing device, of the processing server, configured to identify at least a correspondence between the forensic data included in the received forensic profile and transaction data included in the transaction data entries stored in the plurality of consumer profiles to obtain at least a specific consumer identifier, and identify, in the database, a specific consumer profile where the included consumer identifier corresponds to the specific consumer identifier; and a transmitting device, of the processing server, configured to transmit at least the plurality of demographic characteristics associated with the related consumer included in the identified specific consumer profile.

20. The system of claim 19, wherein the consumer identifier is at least one of:

a payment account number, a name, a username, an e-mail address, a phone number, an interne protocol address, a media access control address, and a set of consumer characteristics.

21. The system of claim 19, wherein the forensic data includes at least one of: call data, application program data, short message service data, multimedia message service data, e-mail data, and geographic location data.

22. The system of claim 19, wherein the plurality of consumer characteristics includes at least one of: age, gender, income, residential status, marital status, familial status, occupation, education, geographic location, postal code, zip code, and street address.

23. A system for linking forensic data to transaction history, comprising:

a receiving device, of a processing server, configured to receive (1) from a financial transaction network, a plurality of payment transaction data related to payment transactions processed by said financial transaction network and (2) a forensic profile, wherein the forensic profile includes forensic data obtained from a computing device associated with a specific consumer and a plurality of demographic characteristics associated with the specific consumer;

a database, of the processing server, configured to store a plurality of consumer profiles, wherein each consumer profile includes data related to a consumer including at least a plurality of consumer characteristics associated with the related consumer and a plurality of transaction data entries each corresponding to a payment transaction involving the related consumer and including payment transaction data received from the financial transaction network, wherein all personally-identifiable information (PII) of consumers associated with each consumer profile of the plurality of consumer profiles is encrypted to render said PII unidentifiable, said encryption mode being a one-way encryption, and wherein said processing server stores the one-way encrypted PII and cannot decrypt said one-way encrypted PII; and a processing device, of the processing server, configured to identify a specific consumer profile of the plurality of consumer profiles where at least a predefined number of the included plurality of consumer characteristics correspond to the plurality of demographic characteristics, and associate, in the database, the identified specific consumer profile with the forensic data included in the received forensic profile.

24. The system of claim 23, wherein the plurality of consumer characteristics includes at least one of: age, gender, income, marital status, familial status, residential status, occupation, education, zip code, postal code, street address, county, city, state, and country.

25. The system of claim 23, wherein each transaction data entry includes at least transaction data, a consumer identifier associated with the related consumer, and a merchant identifier associated with a merchant involved in the corresponding payment transaction.

26. The system of claim 25, wherein the transaction data includes at least one of: a transaction amount, product data, transaction time and/or date, geographic location, coupon data, and point-of-sale identifier.

* * * * *